United States Patent Office 3,352,821
Patented Nov. 14, 1967

3,352,821
TiO₂ DELUSTERED POLYAMIDE STABILIZED WITH A MANGANESE COMPOUND AND AN OXY COMPOUND OF PHOSPHORUS
Winston Costain, Manchester, and Harold John Palmer and Trevor Raymond White, Pontypool, England, assignors to Imperial Chemical Industries Limited, London, and British Nylon Spinners Limited, Pontypool, England, both British corporations
No Drawing. Filed Sept. 3, 1963, Ser. No. 306,313
Claims priority, application Great Britain, Sept. 3, 1962, 33,683/62
7 Claims. (Cl. 260—45.75)

This invention relates to a process for stabilising titanium dioxide delustred synthetic linear fibre forming polyamides.

It has already been proposed to stabilise polyamides of the nylon family with manganese compounds against the degradation associated with exposure to light particularly when the polyamides are pigmented with titanium dioxide. However, nylon fabrics made from synthetic linear fibre forming polyamides which have been stabilised against light degradation by the use of manganese compounds suffer from certain defects. Thus nylon cloth is usually heat set in air at about 200° C. and because of oxidation this setting causes discolouration of the fabric necessitating a subsequent bleach treatment. When nylon materials containing manganese salts such as, for instance, the acetate or lactate are bleached with either sodium chlorite or peracetic acid a greyish-yellow discolouration generally develops presumably from oxidation of the manganese stabiliser. This second type of discolouration can be removed in a sodium bisulphite reducing bath but in addition to being an unwanted extra process this markedly reduces the light resistance of the yarn. Consequently to obtain a satisfactory product it is desirable to avoid the final bisulphite treatment. It has been found that when certain manganese phosphates, for example those mentioned in U.K. patent specifications Nos. 861,354 and 862,577 are used as light stabilisers it is possible to dispense with the bisulphite treatment but even so some degree of discolouration occurs on bleaching and the materials are not entirely satisfactory.

We have now found that if in addition to a manganese compound there is introduced into the titanium dioxide delustred nylon a selected excess proportion of the anion of an oxy compound of phosphorus relative to the manganese ion there is a surprising reduction in the degree of discolouration produced by bleaching with sodium chlorite or peracetic acid. The manganese compound may itself be an oxy compound of phosphorus and when this is the case a second oxy compound of phosphorus must be added.

According to the present invention we provide titanium dioxide delustred synthetic linear polyamides of improved resistance to the degradative effects of exposure to light containing a manganese compound in an amount calculated as manganese of from 5 parts to 100 parts per million parts by weight of the polyamide, and at least one oxy compound of phosphorus as hereinafter defined in a proportion such that for each manganese ion in its divalent form there are more than 1.5 and up to 7.0 equivalent or stoichiometric amounts of an anion derived from an oxy compound of phosphorus as hereinafter defined.

Although the terms "anion" and "ion" are used for convenience in the present specification the radicals which they describe are not necessarily present in the polyamides in the ionised state, but for the purposes of calculation are assumed to be fully ionised.

The manganese compound and the oxy compound of phosphorus may be introduced into the polyamide during or after manufacture but are preferably incorporated during manufacture, either by addition to the polymer intermediates before polymerisation, i.e. to the salt solution, or during the pressure stage of the polymerisation.

The titanium dioxide may be added at any stage of the polymerisation but it is preferably added during the period when the ebullition within the autoclave facilitates the dispersion of the titanium dioxide particles.

Suitable manganese compounds which may be employed are for example the formate, acetate, lactate, stearate, oxalate, adipate, sebacate, naphthenate salicylate, anthranilate, chloride, orthophosphate, pyrophosphate, polyphosphates, sulphate, the complexes with for example 2,4-pentanedione, 8-hydroxyquinoline, acetylacetic acid methyl ester, salicylaldehyde or any of the mangaese compounds referred to in German patent specification No. 737,943. Preferably the manganese compounds are employed in the form of manganous salts, the salts with the abovementioned aliphatic carboxylic acids being especially suitable.

The oxy compound of phosphorus may be any of the various forms of phosphoric, phosphorus and hypophosphorous acids or the salts of such oxy acids of phosphorus, for example, the salts with alkali metals, ammonia or organic bases such as hexamethylene diamine or any of the organic bases mentioned in U.K. patent specifications Nos. 839,067 and 864,701. Particularly suitable sources of the anions are the ortho and pyrophosphate salts, but if desired complex phosphates such as the polyphosphates for example Graham's salt ("sodium hexametaphosphate") may also be used. The oxy compounds of phosphorus providing the excess of anions are preferably water-soluble. By using mixtures of such compounds, mixed anions may be introduced into the polyamides. When the manganese compound is added in the form of a salt with one of the above-mentioned oxy acids of phosphorus it is necessary to add a further amount of another oxy compound of phosphorus, this addition being adjusted so that the relationship mentioned above between the anion or acid radical of the oxy compound of phosphorus and the manganese ion or radical is maintained.

Although an amount of phosphorus anions greater than 1½ equivalents relative to the manganese radical in its divalent form must be present it is usually preferred to employ from 2 to 3 equivalents. Proportions greater than 7 equivalents of phosphorus anions may be effective but usually it is desirable to keep to a minimum the proportion of inorganic anions in polyamides especially when the polyamides are to be spun into yarns.

The invention is illustrated but not limited by the following example in which parts and percentages are by weight:

*Example 1*

Nylon polymers containing a manganese compound, titanium dioxide delustrant and excess phosphorus compound were made by the method described below. The stabilised polymers were subjected to chlorite and peracetic acid bleach tests and any discolouration assessed on an arbitrary scale of 0–15 (0 denotes no discolouration and 15 is equivalent to the deepest yellowing observed. Polymers with a rating of 9 on this scale are considered fairly satisfactory).

In the preparation of the stabilised nylon polymers the manganese and phosphorus compounds were added either to the polymer intermediates before polymerisation started, i.e. to the 'salt solution,' or during the pressure stage of the polymerisation. The titanium dioxide was added during the pressure stage at 250 lb. per sq. in.

POLYMERISATION

A 70% aqueous solution of hexamethylene-diammonium adipate containing a small amount of acetic acid as viscosity stabiliser, e.g. 0.5 mole percent, was heated in an autoclave to a temperature of about 215° C. and pressure of 250 per sq. in. gauge. The heating was continued and the pressure maintained at 250 per sq. in. by bleeding off steam until the internal temperature attained 245° C. The pressure was then gradually reduced to atmospheric during 90 minutes after which time the temperature had risen to ca. 270° C. Polymerisation was continued by heating at atmospheric pressure for a further 30 minutes the temperature rising to approximately 275° C. At this stage the polymer was extruded from the autoclave under nitrogen pressure. It was then quenched and chipped into small flakes.

Typical results are tabulated below:

| Sample | Percent $TiO_2$ content | Manganese compound | | | Phosphorus compound | | | Bleach rating | |
|---|---|---|---|---|---|---|---|---|---|
| | | Form | Amount, p.p.m.[1] | Stage of addition | Form | Amount, p.p.m.[2] | Stage of addition | Chlorite bleach test | Peracetic bleach test |
| 1 | 2.0 | Acetate | 55 | Pressure | | | | 14 | 14 |
| 2 | 2.0 | do | 75 | Salt soln | $Na_4P_2O_7$ | 126 | Pressure | 4 | 10 |
| 3 | 2.0 | do | 75 | do | $Na_4P_2O_7$ | 210 | do | 3 | 6-7 |
| 4 | 2.0 | Pyrophosphate | 100 | do | | | | 13 | 15 |
| 5 | 2.0 | do | 75 | do | $Na_4P_2O_7$ | 168 | Pressure | 2-3 | 5-6 |
| 6 | 2.0 | Acetate | 75 | do | $Na_4P_2O_7$ | 210 | Salt soln | 3 | 8 |
| 7 | 2.0 | do | 75 | do | $H_3PO_4$ | 210 | do | 1-2 | 5-6 |
| 8 | 0.3 | do | 25 | do | | | | | |
| 9 | 0.3 | do | 25 | do | $H_3PO_4$ | 70 | Salt soln | 2-3 | 1-2 |

[1] Calculated as manganese.
[2] Calculated as phosphorus.

Example 2.—Effect of P/Mn ratio on light stability and resistance to bleach discolouration Four 15 denier monofilament yarns were spun from nylon polymers containing besides 0.3% titania (1) no stabiliser, (2) 10 p.p.m. manganese (added as the acetate to hexamethylene diammonium adipate), (3) 10 p.p.m. manganese and 11.3 p.p.m. phosphorus (added as sodium pyrophosphate) and (4) 10 p.p.m. manganese and 22.6 p.p.m. phosphorus (also added as sodium pyrophosphate).

Samples of the resultant yarns were irradiated for 24 hours and the resultant percentage losses in yarn strength were determined. Other samples of the yarns were subjected to standardised tests simulating the sequences of dry heat setting and chlorite (or peracetic acid) bleaching. The reflectance properties and degree of yellowness of wound pads of yarns were determined.

| Mn content, p.p.m. | P content, p.p.m. | Yarn colour (blue chromaticity ratio) | | Percent loss of strength after 24 hours irradiation |
|---|---|---|---|---|
| | | Before treatment | After treatment | |
| zero | zero | 0.347 | 0.346 | 25.0 |
| 10 | zero | 0.344 | 0.339 | 2.25 |
| 10 | 11.3 | 0.345 | 0.345 | 2.50 |
| 10 | 22.6 | 0.345 | 0.345 | nil |

Locknit fabrics were constructed from these yarns and samples of the fabrics were heat set in the greige state and bleached in various bleach liquors (sodium chlorite, peracetic acid, peracetic acid and sodium di-hydrogen phosphate). Under all bleach conditions the fabrics containing 10 p.p.m. manganese and 11.3 or 22.6 p.p.m. phosphorus were acceptable in their degree of whiteness and equal to fabric containing no manganese. The fabric containing 10 p.p.m. manganese and no phosphate had a marked yellow tinge and required further treatment in sodium sulphite solution to obtain an acceptable white appearance.

Example 3.—Light resistance of yarns containing manganese and excess phosphate additives Polymer containing 10 p.p.m. manganese (added as the acetate to hexamethylene diammonium adipate salt) and 11.3 p.p.m. phosphorus (added as sodium pyrophosphate decahydrate to hexamethylene diammonium adipate) and 0.3% titania added during the course of the release of steam under 250 p.s.i. gauge pressure during the polymerization step.

40 denier yarn/13 filaments was melt spun from the resultant polymer.

The following results were obtained for the breaking strengths of this yarn and a control yarn without manganese or phosphate additions before and after irradiation for 24 hours in an irradiation apparatus containing a 1500 watt xenon arc source.

| | Tenacity of yarns in g./denier | | Percent Loss |
|---|---|---|---|
| | Before irradiation | After irradiation | |
| Control yarn (no Mn or P) | 5.36 | 4.84 | 10 |
| Stabilised yarn (10 p.p.m. Mn, 11.3 p.p.m. P) | 5.45 | 5.31 | 2½ |

Fabrics were warp knitted from the above two yarns and also from another yarn containing 10 p.p.m. manganese added as the acetate and without addition of phosphate. The fabrics were subjected to finishing processes of heat setting (½ minute at 200° C.) and bleaching in either peracetic or sodium chlorite bleaches.

The fabric made of yarn free from manganese and phosphate and the fabric containing both 10 p.p.m. manganese and 11.3 p.p.m. phosphate were of commercially acceptable whiteness whereas the colour of the fabrics containing 10 p.p.m. manganese without phosphate addition was unacceptable.

Example 4.—Adverse effects of high phosphate content

High levels of phosphate having an adverse influence on pack life (i.e. the time for the decrease in the filament diameter under set spinning conditions to reach an unacceptable level).

The foilowig results refer to the spinning performance of polymers containing 0.3% titania, 10 p.p.m. manganese (added as the acetate) and various contents of phosphorus (added as sodium pyrophosphate).

| P content (parts per million) | P/Mn Ratio | Pack life to low denier in hours | Drawtwist breaks/100 lb. |
|---|---|---|---|
| 11.3 | 2 | 250 | 12 |
| 22.6 | 4 | 165 | 11 |
| 45.2 | 8 | 109 | 18 |
| 56.5 | 10 | 75 | 10 |

What we claim is:

1. Titanium dioxide delustred synthetic linear polyamides of improved resistance to the degradative effects of exposure to light containing a manganese compound in an amount calculated as mangaese of from 5 parts to 100 parts per million parts by weight of the polyamide, and at least one oxy compound of phosphorus selected from the group consisting of orthophosphates, pyrophosphates and complex phosphates in a proportion such that for each manganese ion in its divalent form there are more than 1.5 and up to 7.0 equivalent or stoichiometric amounts of an anion derived from said oxy compound of phosphorus.

2. Titanium dioxide delustred synthetic linear polyamides according to claim 1 wherein the manganese compounds are manganous salts.

3. Titanium dioxide delustred synthetic linear polyamides according to claim 1 wherein the oxy compound of phosphorus providing the excess of anions is water-soluble.

4. Titanium dioxide delustred synthetic linear polyamides according to claim 1 wherein the anion of the oxy compound of phosphorus is a pyrophosphate ion.

5. Titanium dioxide delustred synthetic linear polyamides according to claim 1 wherein from 2 to 3 equivalents of phosphorus containing anions relative to the manganese ion are present.

6. Process for improving the resistance of titanium delustred synthetic linear polyamides to the degradative effects of exposure to light which comprises introducing into the polyamides, prior to bleaching said polyamide, a manganese compound in an amount calculated as manganese of from 5 parts to 100 parts per million parts by weight of the polyamide, and at least one oxy compound of phosphorus selected from the group consisting of orthophosphates, pyrophosphates and complex phosphates in a proportion such that for such that for each manganese ion in its divalent form there are more than 1.5 and up to 7.0 equivalent or stoichiometric amounts of an anion derived from said oxy compound of phosphorus.

7. Titanium dioxide delustred synthetic linear polyamides as set forth in claim 2 wherein the manganese compound is a salt with an aliphatic carboxylic acid.

References Cited

UNITED STATES PATENTS 3,160,597  12/1964  Costain et al. _____ 260—45.75
3,173,898  3/1965  Sum _____ 260—45.75

FOREIGN PATENTS 902,906  8/1962  Great Britain.

DONALD E. CZAJA, *Primary Examiner.*

L. J. BERCOVITZ, *Examiner.*

V. P. HOKE, *Assistant Examiner.*